United States Patent Office 3,062,053
Patented Nov. 6, 1962

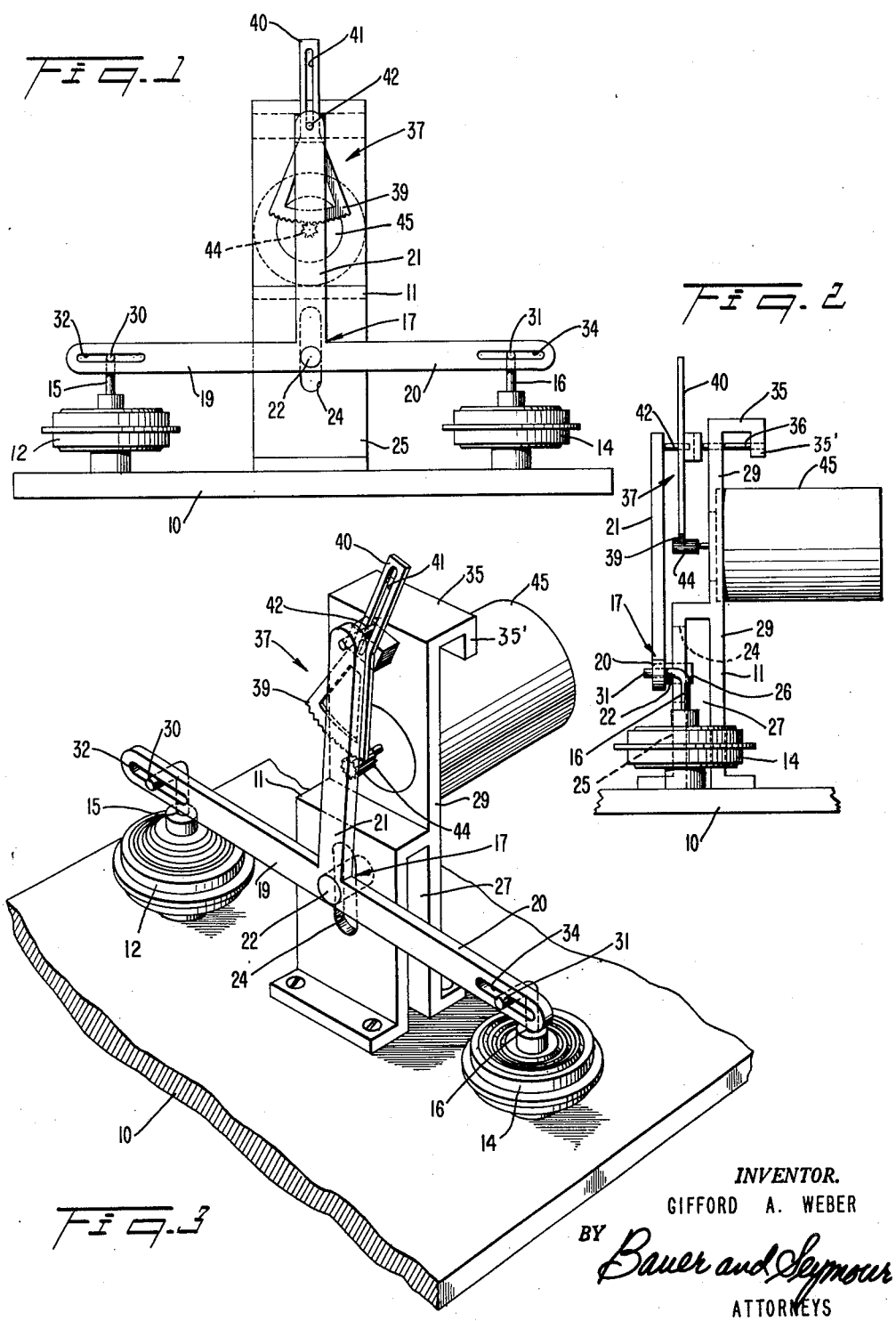
Nov. 6, 1962     G. A. WEBER     3,062,053
DISPLACEMENT RATIO TRANSMITTER
Filed June 29, 1960     2 Sheets-Sheet 1
INVENTOR.
GIFFORD A. WEBER
BY Bauer and Seymour
ATTORNEYS

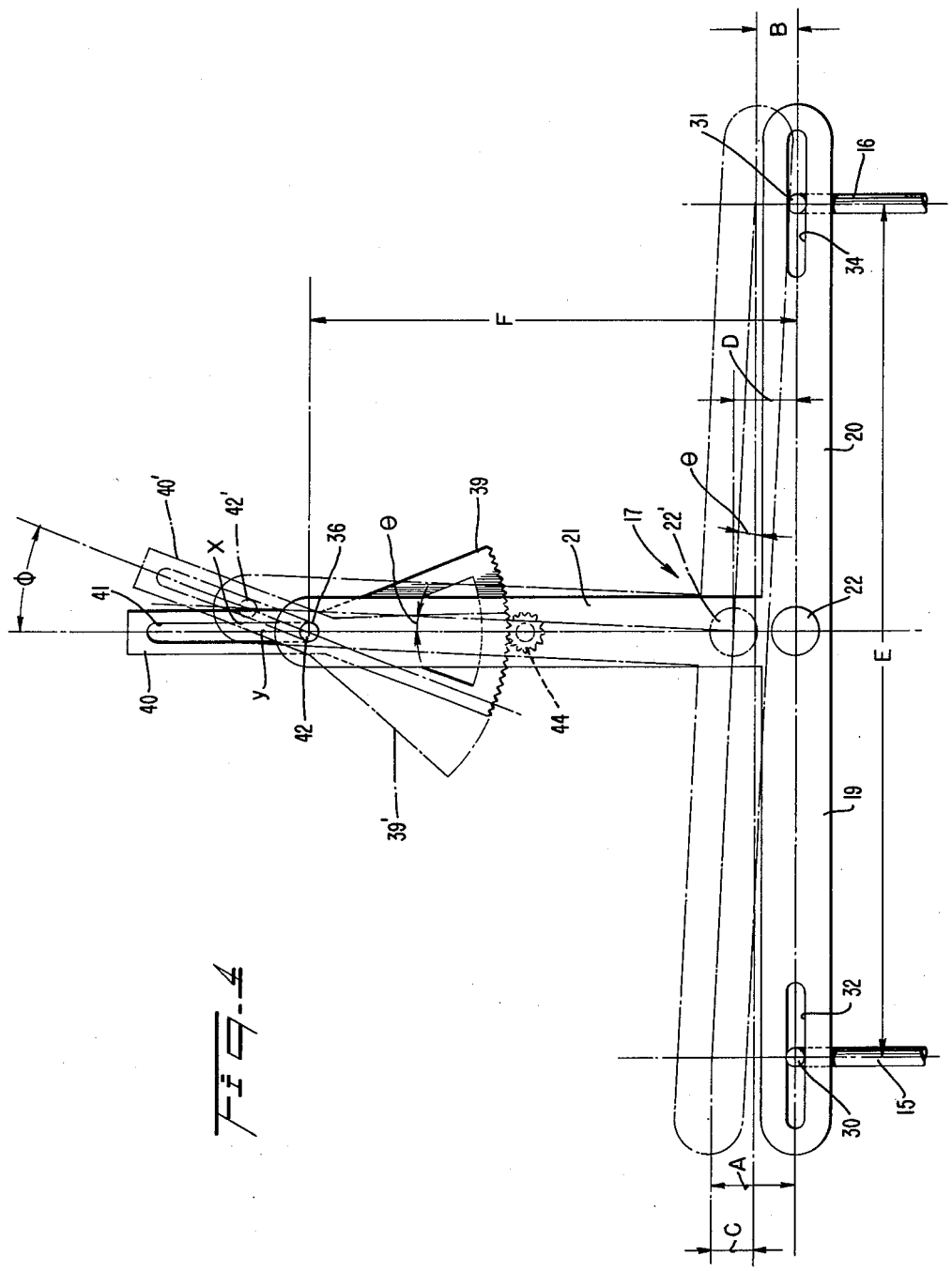

3,062,053
DISPLACEMENT RATIO TRANSMITTER
Gifford A. Weber, Wayne, N.J., assignor to The Bendix Corporation, South Montrose, Pa., a corporation of Delaware
Filed June 29, 1960, Ser. No. 39,710
10 Claims. (Cl. 73—407)

This invention relates to a displacement ratio transmitter. More particularly, the invention relates to a simple mechanical device for directly transmitting the ratio of two displacements.

An illustrative, non-limiting example of the use of the transmitter of the invention is in connection with an engine of the jet type. With such engine, the ratio of the turbine outlet total pressure to the compressor inlet total pressure is a measure of the engine's thrust. At present there are several mechanisms available for detecting and transmitting this ratio, but such mechanisms, in the main, are complicated and are thus prone to failure under arduous operating conditions. The displacement ratio transmitter of the present invention is simple, economical to make, and rugged in construction.

It is among the objects of the present invention to provide a novel displacement ratio transmitter which is primarily mechanical in character and which employs a simple linkage.

Yet another object of the invention resides in the provision of a displacement ratio transmitter of the character indicated which possesses an accuracy well within allowable tolerances.

Still another object of the invention resides in the provision of a novel displacement ratio transmitter incorporating a minimum of parts, and in a preferred embodiment thereof, incorporating simple direct means for driving an angular displacement indicating means such as a synchro generator.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in side elevation of a preferred embodiment of displacement ratio transmitter made in accordance with the invention, such transmitter being shown in its unloaded, inoperative condition;

FIG. 2 is a view in end elevation of such transmitter in unloaded condition.

FIG. 3 is a fragmentary view in perspective of the device of FIGS. 1 and 2 in loaded, operating condition; and FIG. 4 is a somewhat diagrammatic view in side elevation of the main parts of the ratio transmitter indicating the displacement and angular relationship between such parts at both the unloaded and a loaded position thereof.

Turning now to the drawings, the illustrative embodiment of displacement ratio transmitter is shown mounted on a base 10 which may be a horizontal metal plate. From base 10 there rises a vertical frame member generally designated 11. Secured to base 10 at equal distances on opposite sides on upright frame 11 are expansible chamber devices 12 and 14. In the embodiment shown, such devices are in the form of hollow annular enclosures having flexible diaphragm members forming the upper and lower end members thereof. The bottom end member of each of devices 12 and 14 is centrally secured to base 10, fluid under pressure being led to devices 12 and 14 through the respective means attaching them to the base. Centrally secured to the upper end member of each of devices 12 and 14 is a vertical plunger 15 and 16, respectively. It will be assumed, in subsequent discussion, that the interior of device 12 is connected to a source of pressure which is connected to the jet engine at the outlet end thereof, and that the interior of device 14 is connected to a source of fluid pressure connected to the compressor inlet end of the jet engine. The upward displacement of plunger 15, therefore, when the jet engine is in operation, yields a measurement of the turbine outlet total pressure, and the upward displacement of plunger 16 affords a measure of the compressor inlet pressure. The ratio transmitter of the present invention correlates the upward displacements of plungers 15 and 16 and gives an instantaneous reading of the ratio between them.

A three-armed lever 17 is mounted vertically above plungers 15 and 16 and is connected thereto in a manner to be described. Such lever is pivotally mounted at its center on upright frame 11, the pivot pin 22 mounting the lever being free to move vertically as required by the joint motion of plungers 15 and 16. The three-armed lever has a left hand arm 19 and a right hand arm 20, the arms 19 and 20 being disposed horizontal when the transmitter is unloaded, being of equal length, and being disposed in alignment in the same vertical plane. A third arm 21 extends upwardly from the center of the composite arm 19, 20 at right angles thereto and in the same vertical plane. The pivot pin 22 mounting three-armed lever 17 is located midway of arm 19, 20 in line with the center line of arm 21. Pin 22 slides vertically in slot 24 in a forward vertical portion 25 of frame 11, a head 26 on the pin sliding freely in a space 27 between the forward frame portion 25 and a rear parallel vertical portion 29 thereof.

The upper ends of plungers 15 and 16 are pivotally connected to the respective ends of arms 19 and 20 by pin and slot connections. Thus the upper end of plunger 15 is bent forwardly into a horizontal pin 30 which is slidably received in a longitudinal slot 32 adjacent the end of arm 19. The upper end of plunger 16 is similarly bent forwardly into a horizontal pin portion 31 slidably received in longitudinal extending slot 34 adjacent the end of arm 20. The thus described construction allows each of plungers 15 and 16 to rise freely, and allows the three-armed lever 17 freely to rise, and also to oscillate as required about pivot pin 22. The third arm 21 of the three-armed lever is disposed vertical when the transmitter is unloaded. Arm 21 is drivingly connected to a link mechanism and thence to an indicator mechanism which affords an instantaneous indication of the angle through which arm 21 is tipped about pin 22.

The upper end of portion 29 of frame element 11 extends rearwardly and then downwardly into a short vertical flange 35. Journalled in bearings in frame portion 29 and in flange 35 is a horizontal shaft 36 to which is secured a further lever 37. Lever 37 is mounted in a vertical plane which is parallel to and somewhat behind the vertical plane containing the three-arm lever 19, 20, 21. Lever 37 is of the first-class type, one arm 40 of the lever extending above shaft 36. Vertically centrally disposed in arm 40 is a slot 41 which slidably but accurately receives a horizontal rearwardly directed pin 42 secured to arm 21 adjacent the upper end of the latter. The lower arm of lever 37 is in the form of a gear sector which drivingly meshes with a pinion 44 on the driving shaft of a synchro generator or transmitter 45. As is conventional, element 45 may be connected by a suitable circuit to a synchronous displacement indicator, the rotating element of which turns through the same angle as the driving shaft of element 45. Such indicating means (not shown) may be calibrated to give a direct reading of the ratio of the turbine outlet total pressure to the compressor inlet total pressure, assuming the ratio transmitter is employed in conjunction with a jet engine as above described.

The manner of operation of the above described device will be more readily understood upon consideration of FIG. 4. In such figure the position of the parts of the transmitters in their at rest, unloaded position is shown in solid lines, a typical operating or loaded position of the parts being shown in such figure in dotted lines. In such figure, the angle $\theta$ indicates the angle of inclination of arms 19, 20 of the device in its loaded position. A designates the distance which pin 30 has risen from its unloaded to its loaded position, and B designates the distance which pin 31 has risen from its unloaded to its loaded position. $C = A - B$. D equals the distance the pivot pin 22 has risen from its unloaded position to its operative position 22'. E is the center line distance between plungers 15 and 16. $\phi$ is the angle through which lever 37 has been swung from the vertical position of FIGS. 1 and 2 into the dotted line operative position of FIG. 4. $x$ is the horizontal coordinate of the operative position 42' of pin 42, assuming a coordinate system having a horizontal and a vertical coordinate passing through the unloaded position of pin 42. $y$ is the vertical coordinate system. F is the distance between the centers of pivot pins 22 and 42.

When the three-arm lever has risen and tipped into the dotted line position, shown in FIG. 4, the pin 42 on arm 21 thereof will have risen and travelled to the right into the position 42'. This causes lever 37 to tip clockwise (FIG. 4) as the pin 42 travels upwardly within slot 41 in the upper arm 40 thereof. Gear sector 39 accordingly turns the shaft of synchro 45 through a predetermined angle, such angle being indicated on the described indicating device. As will now be shown, the motion of drive pin 42 for any ratio of the displacements of plungers 15 and 16 is a straight line. Accordingly, the angle of rotation of lever 37 is related to the rising of the three-arm lever and its rotation in a simple predetermined manner, and the signal indicated by synchro 45 bears a fixed predetermined relationship to the ratio of displacements of plungers 15 and 16. This can readily be seen from the following:

When $$A > 0 \text{ and } B > 0$$

which is always true of the loaded system described, $$D = \frac{A+B}{2}$$

as can be seen in FIG. 4, and $$\tan \theta = \frac{C}{E}$$

These are the equations of motion of the driving pin 42.

It is now desired to derive the equation of motion of the lever or sector link 37 in terms of the angle $\phi$, through which such lever 37 swings, and the displacement ratio $$\frac{A}{B}$$

Since the lever 37 rotates about the starting point of the drive pin 42 (at $A = B = 0$ the drive pin 42 is co-axial of shaft 36), this equation is easily obtained as follows. For any given A and B the drive pin 42 will be out in the slot 41 at some angle $\phi$, where $\phi$ is the angle between the vertical and a line drawn through the instantaneous position drive pin 42 and shaft 36.

The instantaneous position of drive pin 42, shown at 42' in FIG. 4, can be given in terms of a vertical coordinate $y$ and a horizontal coordinate $x$ measured from the unloaded position of pin 42. Then $$\tan \phi = \frac{x}{y}$$

It can immediately be seen that $y$ equals the vertical distance D travelled by both pivot pin 22 and drive pin 42. Thus $$y = D = \frac{A+B}{2}$$

Since the angle $\theta$ is very small (it is shown exaggerated in FIG. 4 for clarity of illustration), it lies in the range $\tan M\theta = M \tan \theta$, and the arc through which the drive pin 42 swings can be approximated by the straight line $x$. Therefore $$\tan \theta = \frac{A-B}{E} = \frac{x}{F}$$

and solving for $x$, $$x = \frac{F(A-B)}{E}$$

but $$y = \frac{A+B}{2}$$

then $$\tan \theta = \frac{x}{y} = \frac{\frac{F(A-B)}{E}}{\frac{A+B}{2}}$$

$$= \frac{2F}{E} \cdot \frac{A-B}{A+B}$$

dividing both the numerator and denominator by B, $$= \frac{2F}{E} \cdot \frac{A/B - 1}{A/B + 1} = K \frac{A/B - 1}{A/B + 1}$$

where K is a constant
when $$A/B = 1, \tan \theta = 0 \text{ and } \tan \phi = 0$$

and when $$A/B = \text{constant},$$

$$\tan \phi = K \frac{\text{constant} - 1}{\text{constant} + 1} = \text{constant}$$

Therefore the resultant motion of the drive pin for any displacement ratio of the plungers 15 and 16 will be a straight line.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. A displacement ratio transmitter comprising a composite first lever having an elongated first arm, separate means spaced along the length of the first arm to thrust the arm selective distances in directions generally at right angles to the length of the first arm and generally in the plane of the first arm, a second arm extending at right angles to and connected to the first arm, the first and second arms being generally coplanar, a first pivot means for pivotally mounting the composite lever for oscillation about a floating pivotal axis located at the intersection of the first and second arms and disposed normal to the planes of the first and second arms, means mounting the first and second arms so as to allow said floating pivotal axis to move in the direction in which the second arm extends in the unloaded condition of the transmitter, a second lever, a second pivot means mounting the second lever on a second pivotal axis parallel to said floating pivotal axis and intersecting the axis of said second arm when the first lever of the transmitter is unloaded, a connection between the second arm and the second lever, the axis of such connection lying coaxial of the second pivotal axis when the transmitter is unloaded, the connection being slidable along the second lever when the first arm is displaced by the loading of the transmitter, and means indicating the angular displacement of the second lever.

2. A displacement ratio transmitter as defined in claim 1, wherein the second arm and the floating pivot means are located at the longitudinal center of the first arm.

3. A displacement ratio transmitter as defined in claim 2, wherein the second lever is a first-class lever and, when the transmitter is unloaded, the end portions of the second lever lie in alignment with the second arm.

4. A displacement ratio transmitter as defined in claim 3, wherein the connection between the second arm and the second lever is slidable from the axis of the second pivot means in a direction away from the first arm.

5. A displacement ratio transmitter as defined in claim 4, wherein the connection between the second arm and the second lever comprises a pin adjacent the end of the second arm and a longitudinally extending slot in an end portion of the second lever receiving said pin.

6. A displacement ratio transmitter as defined in claim 5, wherein the slot in the second lever is in the end portion of the second lever remote from the first arm.

7. A displacement ratio transmitter as defined in claim 5, wherein the indicating means is a synchronous generator and means drivingly connecting the synchronous generator to the second lever.

8. A displacement ratio transmitter as defined in claim 7, wherein the driving means comprises a gear sector on an end portion of the second lever, and a pinion on the driving shaft of the synchronous generator meshing with said gear sector.

9. A displacement ratio transmitter as defined in claim 8, wherein the gear sector is on the end portion of the second lever nearer the first arm.

10. A displacement ratio transmitter as defined in claim 7 wherein the transmitter is a pressure differential meter, and the separate means for thrusting the first arm are thrust means responsive to two different pressures.

References Cited in the file of this patent

UNITED STATES PATENTS

| | | |
|---|---|---|
| 1,729,178 | Motheral | Sept. 24, 1929 |
| 2,450,772 | Watkins | Oct. 5, 1948 |